United States Patent
Luo et al.

(10) Patent No.: US 12,274,998 B2
(45) Date of Patent: Apr. 15, 2025

(54) THREE-DIMENSIONAL ALKYNYL-CONTAINING POROUS AROMATIC FRAMEWORK POLYMER AND PREPARATION METHOD AND USE THEREOF

(71) Applicant: Nanchang Hangkong University, Nanchang (CN)

(72) Inventors: Xubiao Luo, Nanchang (CN); Xuan Ding, Nanchang (CN); Hui Shi, Nanchang (CN); Xin Sheng, Nanchang (CN); Deng You, Nanchang (CN); Mingming Peng, Nanchang (CN); Penghui Shao, Nanchang (CN); Liming Yang, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 230 days.

(21) Appl. No.: 17/806,593

(22) Filed: Jun. 13, 2022

(65) Prior Publication Data

US 2023/0234027 A1 Jul. 27, 2023

(30) Foreign Application Priority Data

Jan. 27, 2022 (CN) .......................... 202210098042.8

(51) Int. Cl.
*B01J 20/26* (2006.01)
*B01J 20/30* (2006.01)
(Continued)

(52) U.S. Cl.
CPC ......... *B01J 20/261* (2013.01); *B01J 20/3085* (2013.01); *C02F 1/285* (2013.01);
(Continued)

(58) Field of Classification Search
CPC ...... B01J 20/261; B01J 20/3085; C02F 1/285; C02F 2101/20; C08G 83/003; C22B 7/006; C22B 11/042
See application file for complete search history.

(56) References Cited

U.S. PATENT DOCUMENTS

2010/0240781 A1   9/2010   Cooper et al.

FOREIGN PATENT DOCUMENTS

| CN | 102492117 A | 6/2012 |
| CN | 112724373 A | 4/2021 |

(Continued)

OTHER PUBLICATIONS

Jiang, J., et al., "Synthetic control of the pore dimension and surface area in conjugated microporous polymer and copolymer networks", Journal of the American Chemical Society, 130, pp. 7710-7720. (Year: 2008).*

(Continued)

*Primary Examiner* — Benjamin L Lebron
(74) *Attorney, Agent, or Firm* — Westman, Champlin & Koehler, P.A.

(57) ABSTRACT

The present disclosure provides a three-dimensional alkynyl-containing porous aromatic framework polymer and a preparation method and use thereof. The polymer has a structure represented by Formula I:

(Continued)

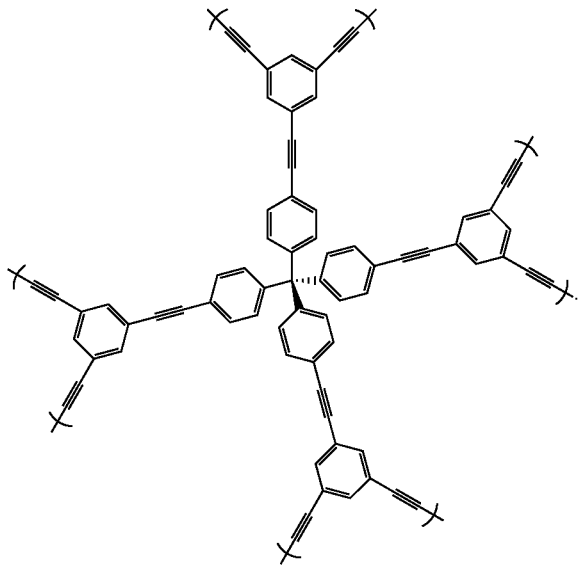

Formula I

The preparation method includes: under a protective atmosphere, mixing tetrakis(p-bromophenyl)methane, 1,3,5-triethynyl benzene, a catalyst and an amine solvent, and subjecting to a Sonogashira-Hagihara coupling reaction to obtain the three-dimensional alkynyl-containing porous aromatic framework polymer having the structure represented by Formula I.

9 Claims, 3 Drawing Sheets

(51) Int. Cl.
*C02F 1/28* (2023.01)
*C08G 83/00* (2006.01)
*C22B 7/00* (2006.01)
*C22B 11/00* (2006.01)
*C02F 101/20* (2006.01)

(52) U.S. Cl.
CPC .......... *C08G 83/003* (2013.01); *C22B 7/006* (2013.01); *C22B 11/042* (2013.01); *C02F 2101/20* (2013.01)

(56) References Cited

FOREIGN PATENT DOCUMENTS

| CN | 113042011 A | 6/2021 |
| CN | 113698579 A | 11/2021 |
| CN | 114471484 B | 10/2023 |

OTHER PUBLICATIONS

Motloch, P., et al., "Gold(I) and silver(I) π-complexes with unsaturated hydrocarbons", Organometallics, 40, pp. 1492-1502. (Year: 2021).*
Nakhjiri, A., et al., "Recovery and precious metals from industrial wastewater towards resource recovery and environmental sustainability: a critical review", Desalination, 527, 115510. Available online Jan. 20, 2022.*
Shaker, M., "Adsorption of Co(II), Ni(II) and Cu(II) ions onto chitosan-modified poly(methacrylate) nanoparticles: Dynamics, equilibrium and thermodynamics studies", Journal of the Taiwan Institute of Chemical Engineers, 57, pp. 111-122. (Year: 2015).*
Li, H., et al., "Kinetics, thermodynamics, and equilibrium of As(III), Cd(II), Cu(II), and Pb(II) adsorption using porous chitosan bead-supported MnFe2O4 nanoparticles", International Journal of Mining Science and Technology, 31, pp. 1107-1115. (Year: 2021).*
Shi et al. "Synthesis of Conjugated Microporous Polymers for Gas Storage and Selective Adsorption", Journal of Materials Science, Jun. 24, 2015, pp. 6388-6394, vol. 50.
Office Action in corresponding Chinese application No. 202210098042.8 dated Apr. 21, 2023.
Notification to Grant Patent in corresponding Chinese application No. 202210098042.08 dated Sep. 16, 2023.

* cited by examiner

THREE-DIMENSIONAL ALKYNYL-CONTAINING POROUS AROMATIC FRAMEWORK POLYMER AND PREPARATION METHOD AND USE THEREOF

CROSS REFERENCE TO RELATED APPLICATION

This patent application claims the benefit and priority of Chinese Patent Application No. 202210098042.8, entitled "Three-dimensional alkynyl-containing porous aromatic framework polymer and preparation method and use thereof" filed on Jan. 27, 2022, the disclosure of which is incorporated by reference herein in its entirety as part of the present application.

TECHNICAL FIELD

The present disclosure relates to the technical field of water treatment, and in particular to a three-dimensional alkynyl-containing porous aromatic framework polymer and a preparation method and use thereof.

BACKGROUND ART

Precious metals, as a non-renewable resource, are widely used in various modern industrial fields due to their excellent physical and chemical properties. However, the ubiquitous application of precious metals brings tremendous pressure to the already scarce resources and the industrial wastewater derived from them produces irreversible damage to the environment. It is a common goal of modern science and enterprises to achieve the resource utilization by selective recovery of precious metals from industrial wastewater with a complex composition. At present, various treatment methods such as chemical precipitation, ion exchange, membrane filtration and adsorption have been developed and applied. Among them, the adsorption method has a great potential for treating precious metal-contaminated wastewater due to the advantages such as no secondary pollution to environment, high efficiency and low cost. Traditional natural inorganic adsorbents such as bentonite, diatomite and zeolite were equipped with inferior adsorption capacity for precious metals, which hinder the application of these adsorbents. For breaking the limitations of traditional adsorption materials, many novel adsorption materials have been gradually developed and applied in treating precious metal-contaminated wastewater, such as porous graphene, organic resins, bio-adsorbents and metal-organic frameworks (MOFs) materials. Although achieving a desirable adsorption performance, these materials generally face problems such as difficulty in pore size adjustment, poor stability in water phase and difficulty in preparation. Therefore, it is vital to develop an adsorbent material with a simple preparation route, desirable stability and superior adsorption capacity.

Porous organic polymers (POPs) have become rapidly a research hotspot in recent years due to their adjustable porosity and specific surface area, combined with a variety of synthesis methods. As an important class of the porous organic polymers, porous aromatic framework polymers (PAFs) have advantages such as desirable thermochemical stability and ultra-high specific surface area, and can stay stably in extremely harsh environments while retaining their own characteristics and performances to the greatest extent. In view of this, it is a technical problem to be solved at present to develop more types of PAFs to meet the requirements of performance diversity in the adsorption field.

SUMMARY

An objective of the present disclosure is to provide a three-dimensional alkynyl-containing porous aromatic framework polymer and a preparation method and use thereof. The three-dimensional alkynyl-containing porous aromatic framework polymer has an excellent adsorption effect on precious metal ions.

To achieve the above objective, the present disclosure provides the following technical solutions:

The present disclosure provides a three-dimensional alkynyl-containing porous aromatic framework polymer, having a structure represented by Formula I:

Formula I

The present disclosure further provides a method for preparing the three-dimensional alkynyl-containing porous aromatic framework polymer, comprising:

under a protective atmosphere, mixing tetrakis(p-bromophenyl)methane, 1,3,5-triethynyl benzene, a catalyst and an amine solvent, and subjecting to a Sonogashira-Hagihara coupling reaction to obtain the three-dimensional alkynyl-containing porous aromatic framework polymer having a structure represented by Formula I.

In some embodiments, a molar ratio of 1,3,5-triethynyl benzene to tetrakis(p-bromophenyl)methane is in a range of (1-3):1.

In some embodiments, the catalyst comprises cuprous iodide and tetrakis(triphenylphosphine)palladium; a molar ratio of cuprous iodide to tetrakis(triphenylphosphine)palladium is in a range of 1:(0.8-1.2); a molar ratio of tetrakis(p-bromophenyl)methane to tetrakis(triphenylphosphine) palladium is in a range of (9-20):1.

In some embodiments, the amine solvent comprises N,N-dimethylformamide and triethylamine; a volume ratio of N,N-dimethylformamide to triethylamine is in a range of 1:(0.8-1.2); a dosage ratio of tetrakis(p-bromophenyl)methane to triethylamine is in a range of (0.05-0.3) mmol: 1 mL.

In some embodiments, the Sonogashira-Hagihara coupling reaction is conducted at a temperature in a range of 80°

C. to 120° C.; the Sonogashira-Hagihara coupling reaction is conducted for 24 hours (h) to 96 h.

In some embodiments, the method further comprising the following steps after the Sonogashira-Hagihara coupling reaction:

immersing a product system obtained from the Sonogashira-Hagihara coupling reaction in chloroform, then separating solid and liquid to obtain a solid material, and subjecting the solid material to washing, Soxhlet extraction and drying in sequence to obtain the three-dimensional alkynyl-containing porous aromatic framework polymer.

In some embodiments, reagents used in the washing comprise chloroform, acetone, water and methanol in sequence; a reagent used in the Soxhlet extraction is methanol.

The present disclosure further provides use of the three-dimensional alkynyl-containing porous aromatic framework polymer or the three-dimensional alkynyl-containing porous aromatic framework polymer prepared by the method according to the above technical solution in adsorbing a precious metal in water.

In some embodiments, the precious metal comprises at least one selected from the group consisting of silver, gold and palladium.

The present disclosure provides a three-dimensional alkynyl-containing porous aromatic framework polymer. The three-dimensional alkynyl-containing porous aromatic framework polymer is based on a tetrakis(p-bromophenyl) methane monomer as a node. The tetrakis(p-bromophenyl) methane monomer has a three-dimensional structure. As a connecting center of a polymer with three-dimensional space, the unique three-dimensional space configuration and outstanding rigidity of the monomer greatly enhance the chemical resistance of the three-dimensional alkynyl-containing porous aromatic framework polymer to face harsh environments with strong acidity/alkalinity and humidity. The three-dimensional alkynyl-containing porous aromatic framework polymer has ultra-high thermochemical stability and adsorption capacity. Therefore, the three-dimensional alkynyl-containing porous aromatic framework polymer has an extremely high practical value in extremely harsh environments due to its excellent tolerance, which is expected to be an excellent adsorbent to achieve the goal of efficient recovery of precious metals in wastewater. Meanwhile, the three-dimensional alkynyl-containing porous aromatic framework polymer has a desirable adsorption effect, and has broad prospects for recovering precious metal ions in water and realizing resource utilization. The results of Application Examples show that the three-dimensional alkynyl-containing porous aromatic framework polymer has a desirable adsorption capacity to silver ions (calculated based on $Ag^+$, palladium ions (calculated based on $PdCl_4^{2-}$) and gold ions (calculated based on $AuCl_4^-$), with the maximum adsorption capacities of 79.4 mg/g, 291.8 mg/g, and 507.4 mg/g, respectively. In addition, the three-dimensional alkynyl-containing porous aromatic framework polymer has a relatively desirable selectivity for the precious metal ions, with selectivity coefficients for common competing ions in water each being greater than 0.

The present disclosure provides a method for preparing a three-dimensional alkynyl-containing porous aromatic framework polymer. Specifically, the three-dimensional alkynyl-containing porous aromatic framework polymer is prepared by conducting the Sonogashira-Hagihara coupling reaction on the two monomers, tetrakis(p-bromophenyl) methane and 1,3,5-triethynylbenzene, through a new topology design. The Sonogashira-Hagihara coupling reaction belongs to the free radical polymerization of monomers, and is suitable for industrial productions due to its simple process, easy operation and high yield.

The present summary is provided only by way of example, and not limitation. Other aspects of the present invention will be appreciated in view of the entirety of the present disclosure, including the entire text, claims and accompanying figures.

DETAILED DESCRIPTION OF THE EMBODIMENTS

The present disclosure provides a three-dimensional alkynyl-containing porous aromatic framework polymers, having a structure represented by Formula I:

Formula I

In the present disclosure, the three-dimensional alkynyl-containing porous aromatic framework polymer (referred to as PAF-3D) is prepared by subjecting tetrakis(p-bromophenyl)methane and 1,3,5-triethynyl benzene as monomers to a Sonogashira-Hagihara coupling reaction. In Formula I, a three-terminal of group is ligated to , group , group and a four-terminal of group is ligated to to form the three-dimensional alkynyl-containing porous aromatic framework polymer with a topology structure.

In some embodiments, the three-dimensional alkynyl-containing porous aromatic framework polymer has a pore diameter of 0.5 nm to 1.0 nm, a pore volume of 0.3 cm$^3$/g to 0.6 cm$^3$/g, preferably 0.5 cm$^3$/g to 0.6 cm$^3$/g, and a specific surface area of 700 cm$^2$/g to 1000 cm$^2$/g, preferably 900 cm$^2$/g to 1000 cm$^2$/g.

The present disclosure further provides a method for preparing the three-dimensional alkynyl-containing porous aromatic framework polymer, comprising:
under a protective atmosphere, mixing tetrakis(p-bromophenyl)methane, 1,3,5-triethynyl benzene, a catalyst and an amine solvent, and subjecting to a Sonogashira-Hagihara coupling reaction to obtain the three-dimensional alkynyl-containing porous aromatic framework polymer having the structure represented by Formula I.

In some embodiments, a molar ratio of 1,3,5-triethynyl benzene to tetrakis(p-bromophenyl)methane is in a range of (1-3):1, preferably (1.5-3):1. In the present disclosure, the structural formulas of 1,3,5-triethynyl benzene and tetrakis(p-bromophenyl)methane are represented by Formula II and Formula III, respectively:

Formula II

Formula III

In some embodiments, the catalyst comprises cuprous iodide and tetrakis(triphenylphosphine)palladium; a molar ratio of cuprous iodide to tetrakis(triphenylphosphine)palladium is in a range of 1:(0.8-1.2), preferably 1:1; a molar ratio of tetrakis(p-bromophenyl)methane to tetrakis(triphenylphosphine)palladium is in a range of (9-20):1, preferably (12-17):1.

In some embodiments, the amine solvent comprises N,N-dimethylformamide and triethylamine; a volume ratio of N,N-dimethylformamide to triethylamine is in a range of 1:(0.8-1.2), preferably 1:1; a dosage ratio of tetrakis(p-bromophenyl)methane to triethylamine is in a range of (0.05-0.3) mmol: 1 mL, preferably (0.1-0.2) mmol: 1 mL.

In some embodiments, the mixing of tetrakis(p-bromophenyl)methane, 1,3,5-triethynylbenzene, the catalyst and the amine solvent is conducted by: mixing tetrakis(p-bromophenyl)methane, 1,3,5-triethynylbenzene and the catalyst to obtain a mixture, and then adding the amine solvent to the mixture.

In some embodiments, the Sonogashira-Hagihara coupling reaction is conducted at a temperature in a range of 80° C. to 120° C., preferably 90° C. to 110° C., and more preferably 100° C.; the Sonogashira-Hagihara coupling reaction is conducted for 24 h to 96 h, preferably 70 h to 75 h, and more preferably 72 h. In some embodiments, the Sonogashira-Hagihara coupling reaction is conducted under stirring. There is no special limitation on the stirring rate of the stirring, as long as the Sonogashira-Hagihara coupling reaction can be guaranteed to proceed smoothly.

In the present disclosure, before the Sonogashira-Hagihara coupling reaction, a substitution site of tetrakis(p-bromophenyl)methane is ligated to bromine, and alkynyl carbon of 1,3,5-triethynyl benzene is ligated to hydrogen. When the Sonogashira-Hagihara coupling reaction occurs, bromine on tetrakis(p-bromophenyl)methane substitutes hydrogen on alkynyl carbon of 1,3,5-triethynylbenzene under the action of a catalyst, forming a new CC bond and generating HBr. Monomers are ligated in an orderly manner through the CC bond, followed by polymerization to form a long polymer chain, thereby forming the three-dimensional alkynyl-containing porous aromatic framework polymer.

In some embodiments, the preparation method further comprising the following steps after the Sonogashira-Hagihara coupling reaction:

immersing a product system obtained from the Sonogashira-Hagihara coupling reaction in chloroform, then separating solid and liquid to obtain a solid material, and subjecting the solid material to washing, Soxhlet extraction and drying in sequence to obtain the three-dimensional alkynyl-containing porous aromatic framework polymer.

In some embodiments, the immersing is conducted at room temperature and standing for 2.5 h to 3.5 h, preferably 3 h. There is no special limitation on the manner of the separation, specifically, filtration may be used. In some embodiments, the reagents used in the washing comprise chloroform, acetone, water and methanol in sequence; the washing is conducted by filtration. In some embodiments, a reagent used in the Soxhlet extraction is methanol, and the Soxhlet extraction is conducted for 10 h to 15 h, preferably 12 h. In some embodiments, the drying is conducted at a temperature in a range of 60° C. to 70° C., preferably 65° C.; the drying is conducted for 8 h to 12 h, preferably 10 h. In some embodiments, the dried material is ground to a powder without a grainy feeling to obtain the three-dimensional alkynyl-containing porous aromatic framework polymer.

The present disclosure further provides use of the three-dimensional alkynyl-containing porous aromatic framework polymer or the three-dimensional alkynyl-containing porous aromatic framework polymer prepared by the method according to the above technical solutions in adsorbing a precious metal in water. In some embodiments, the precious metal comprises at least one selected from the group consisting of silver, gold and palladium, preferably silver, gold or palladium. In some embodiments, the three-dimensional alkynyl-containing porous aromatic framework polymer is used to adsorb precious metal ions in waste water, specifically, at least one selected from the group consisting of $Ag^+$, $Au^{3+}$ and $Pd^{2+}$. There is no special limitation on the specific use manner of the three-dimensional alkynyl-containing porous aromatic framework polymer, as long as the use manner well known to those skilled in the art may be used. In some embodiments, the adsorption performance of the three-dimensional porous aromatic framework polymer is tested by an isothermal adsorption experiment. Specifically, the three-dimensional porous aromatic framework polymer is placed in a solution containing precious metal ions for adsorption. After the adsorption, an adsorption capacity of the three-dimensional porous aromatic framework polymer is obtained according to the concentration differences of the precious metal ions in the solution before and after the adsorption, to characterize the adsorption performance of the three-dimensional porous aromatic framework polymer.

In some embodiments, an initial concentration of the precious metal ion in the solution containing the precious metal ions is in a range of 50 mg/L to 600 mg/L; a dosage ratio of the three-dimensional porous aromatic framework polymer to the precious metal ion-containing solution is in a range of 10 mg:(15-25) mL, preferably 10 mg: 20 mL; in Application Examples, the adsorption performance of the three-dimensional porous aromatic framework polymer is tested by silver ions (calculated based on AO, gold ions (calculated based on $AuCl_4$) and palladium ions (calculated based on $PdCl_4^{2-}$) as examples.

In some embodiments, the adsorption is conducted at room temperature; in Application Examples, the room temperature is specifically 25° C.; and the adsorption is conducted for 24 h under shaking, a rotation speed of the shaking is in a range of 150 r/min to 200 r/min, preferably 180 r/min.

In some embodiments, the concentration of the precious metal ion in the obtained solution after adsorption is detected by flame atomic absorption spectrophotometry; the adsorption capacity of the three-dimensional porous aromatic framework polymer is calculated according to Formula 1:

$$Q_e = V \times \frac{(C_0 - C_e)}{M}; \qquad \text{Formula 1}$$

In which, $C_0$ represents the concentration (mg/L) of the precious metal ions in the solution before adsorption;

$C_e$ represents the concentration (mg/L) of the precious metal ions in the solution after adsorption;

$Q_e$ represents the adsorption capacity (mg/g) of the alkynyl-containing porous aromatic framework polymer to the precious metal ions;

V represents the volume (L) of the solution containing the precious metal ions; and M represents the mass (g) of the three-dimensional alkynyl-containing porous aromatic framework polymer.

In some embodiments, the adsorption is conducted by placing the three-dimensional porous aromatic framework polymer in a solution to be treated containing precious metal ions and competing ions. After the adsorption, according to the concentration differences of the precious metal ions and the concentration differences of the competing ions in the solution before and after the adsorption, selectivity coefficients of the precious metal ions to the competing ions are obtained, and the selective adsorption performances of the three-dimensional porous aromatic framework polymer for precious metal ions are characterized by the selectivity coefficients.

In some embodiments, the competing ions comprise at least one selected from the group consisting of metal ions, arsenic ions and acid ions. In some embodiments, the competing compounds corresponding to the competing ions comprise copper nitrate, cobalt nitrate, zinc nitrate, nickel nitrate, cadmium nitrate, lead nitrate, potassium pyroantimonate, antimony hydroxide, arsenic hydroxide, disodium hydrogen arsenate, chloroplatinic acid, potassium nitrate and potassium sulfate; and the competing ions are calculated based on $Cu^{2+}$, $Co^{2+}$, $Zn^{2+}$, $Ni^{2+}$, $Cd^{2+}$, $Pb^{2+}$, $Sb(OH)_6^-$, $Sb(OH)_3$, $As(OH)_3$, $HAs(OH)_4^{2-}$, $PtCl_6^{2-}$, $NO_3^-$ and $SO_4^{2-}$. In some embodiments, the concentrations of the precious metal ions and the competing ions in the solution to be treated each are 100 mg/L. In some embodiments, the conditions of the adsorption are consistent with the above-mentioned conditions, which will not be repeated here. There is no special limitation on the calculation manner of the selectivity coefficient, as long as well known to those skilled in the art can be used. Taking the palladium ion as an example, the selectivity coefficients of the palladium ion to the different competing ions is preferably calculated according to Formula 2 and Formula 3:

$$D = \frac{(C_i - C_f) \cdot V}{C_f \cdot M}; \text{ and} \quad \text{Formula 2}$$

$$\beta_{Pd^{2+}/M^{n+/n-}} = \frac{D_{Pd^{2+}}}{D_{M^{n+/n-}}}; \quad \text{Formula 3}$$

in Formula 2, $C_i$ represents the initial concentration (mmol/L) of target ions (including competing ions or $PdCl_4^{2-}$) in the solution before adsorption;

$C_f$ represents the final concentration (mmol/L) of the target ions in the solution after adsorption;

V represents the volume (L) of the solution to be treated;

M represents the mass (g) of the three-dimensional alkynyl-containing porous aromatic framework polymer; and D represents the distribution ratio (L/g) of the target ions in the solution;

in Formula 3, $\beta_{Pd^{2+}/M^{n+/n-}}$ represents the selectivity coefficient of $Pd^{2+}$ to the competing ions;

$D_{Pd^{2+}}$ represents the distribution ratio (L/g) of $Pd^{2+}$; and $D_M^{n+/n-}$ represents the distribution ratio (L/g) of the competing ions.

The technical solutions of the present disclosure will be clearly and completely described below with reference with examples of the present disclosure. It is evident that the described examples are merely a part, rather than all of the examples of the present disclosure. Based on the examples of the present disclosure, all other examples obtained by ordinary of skilled in the field without creative labor shall fall within the protection scope of the present disclosure.

Example 1

0.75 mmol of tetrakis(p-bromophenyl)methane, 1.125 mmol of 1,3,5-triethynyl benzene, 0.06 mmol of cuprous iodide, and 0.06 mmol of tetrakis(triphenylphosphine)palladium were added into a 50 mL round-bottomed flask, 7.5 mL of triethylamine and 7.5 mL of N,N-dimethylformamide were added thereto, The mixture was vacuumized, and protected with argon. A stir switch was opened, and a stirring rate was set up to 550 r/min A heat switch was opened, and an oil bath temperature was set up to 100° C. The mixture was subjected to a polymerization reaction for 72 h, and the device of the reaction was kept sealed during the reaction. After the reaction, the resulting product system was cooled to room temperature (25° C.), rinsed in the round-bottomed flask with chloroform and taken out, stood and immersed in chloroform for 3 h, and filtered, obtaining a solid product. The solid product was filtered and washed with chloroform, acetone, water and methanol in sequence. The washed solid product was subjected to Soxhlet extraction with methanol for 12 h, obtaining a final product. The final product was dried in a 65° C. oven for 10 h. The dried product was ground in a mortar to the powder without a grainy feeling, obtaining a three-dimensional alkynyl-containing porous aromatic framework polymer.

Figure 1:
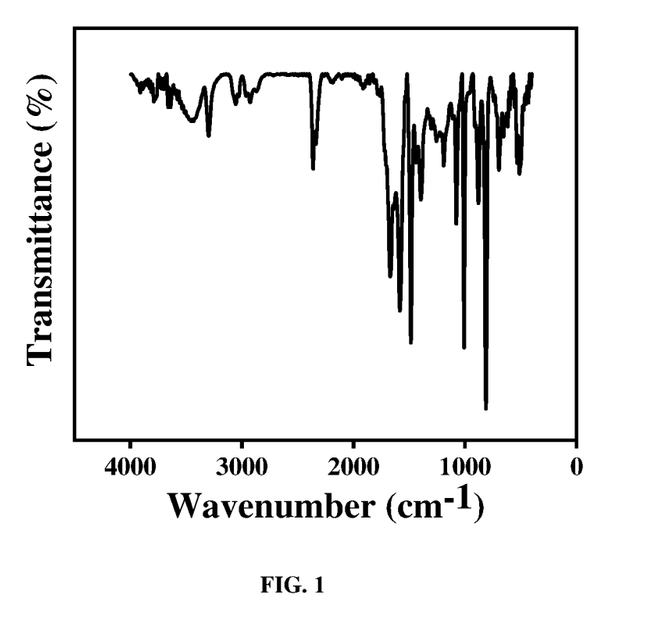
FIG. 1 is an infrared spectrogram of the three-dimensional alkynyl-containing porous aromatic framework polymer prepared according to Example 1.

An infrared spectrum of the three-dimensional alkynyl-containing porous aromatic framework polymer (PAF-3D) prepared in this example is shown in FIG. 1, an absorption peak at 2250 $cm^{-1}$ is assigned to —C≡C— stretching vibration, indicating that the polymerization occurs successfully to obtain the PAF-3D.

Figure 2:
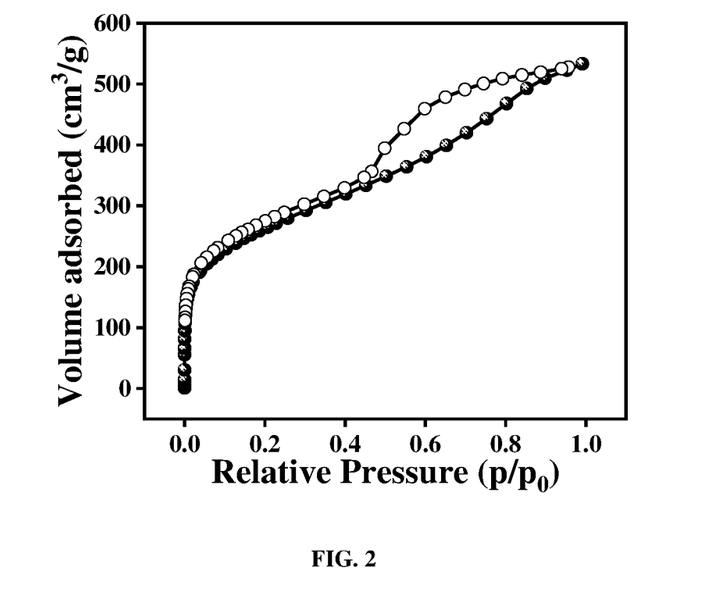
FIG. 2 is an isothermal $N_2$ adsorption-desorption curve of the three-dimensional alkynyl-containing porous aromatic framework polymer prepared according to Example 1.
Figure 3:
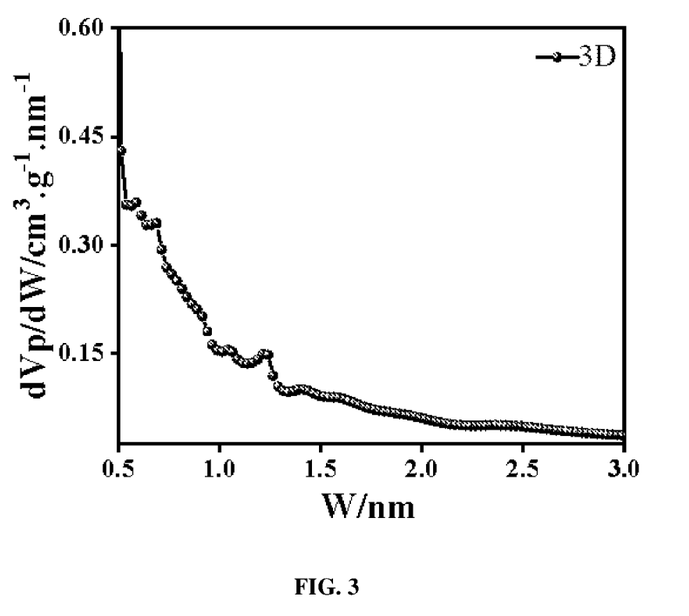
FIG. 3 is a pore size distribution diagram of the three-dimensional alkynyl-containing porous aromatic framework polymer prepared according to Example 1.

A $N_2$ adsorption-desorption experiment was conducted on the PAF-3D, to obtain an isothermal $N_2$ adsorption-desorption curve (FIG. 2) and a pore size distribution diagram (FIG. 3). The results show that the PAF-3D has a specific surface area of 925.38 $cm^2/g$, a uniform pore size distribution with a pore size distribution in a range of 0.5 nm to 1.0 nm, and a pore volume of 0.5055 $cm^3/g$.

Example 2

1 mmol of tetrakis(p-bromophenyl)methane, 3 mmol of 1,3,5-triethynyl benzene, 0.06 mmol of cuprous iodide, and 0.06 mmol of tetrakis(triphenylphosphine)palladium were added into a 50 mL round-bottomed flask, 7.5 mL of triethylamine and 7.5 mL of N,N-dimethylformamide were added thereto, The mixture was vacuumized and protected with argon. A stir switch was opened, and a stirring rate was set up to 550 r/min A heat switch was opened, and an oil bath temperature was set up to 100° C. The mixture was subjected to a polymerization reaction for 72 h, where the device of the reaction was kept sealed during the reaction. After the reaction, the resulting product system was cooled to room temperature, and rinsed in the round-bottomed flask with chloroform and taken out, stood and immersed in chloroform for 3 h, and filtered, obtaining a solid product. The solid product was filtered and washed with chloroform, acetone, water and methanol in sequence. The washed solid product was subjected to Soxhlet extraction with methanol for 12 h obtaining a final product. The final product was dried in a 65° C. oven for 10 h. The dried product was ground in a mortar to the powder without a grainy feeling, obtaining a three-dimensional alkynyl-containing porous aromatic framework polymer.

Application Example 1

Silver nitrate was dissolved in water, and adjusted the pH value to 2 with nitric acid, obtaining a silver nitrate aqueous solution. Sodium tetrachloropalladate was dissolved in water, and adjusted the pH value to 2 with hydrochloric acid, obtaining a sodium tetrachloropalladate aqueous solution. Chloroauric acid was dissolved in water, and adjusted the pH value to 2 with hydrochloric acid, obtaining a chloroauric acid aqueous solution. The silver nitrate aqueous solution, the sodium tetrachloropalladate aqueous solution, and the chloroauric acid aqueous solution were used as solutions to be treated, in which the initial concentrations of precious metal ions (calculated based on $Ag^+$, $PdCl_4^{2-}$ and $AuCl_4$, respectively) each were in a range of 50 mg/L to 600 mg/L.

20 mL of each solution to be treated was added in a conical flask, 10 mg of the PAF-3D prepared in Example 1 was added thereto as an adsorbent, and placed in a constant-temperature shaking box for adsorption at 25° C. and 180 r/min for 24 h. After the adsorption, a small amount of the adsorbed solution was taken out to detect the concentrations of the precious metal ions in the adsorbed solution by flame atomic absorption spectrophotometry, and calculated the adsorption capacity ($Q_e$) of the PAF-3D under different initial concentrations. The calculation formula of the adsorption capacity was represented by Formula 1:

$$Q_e = V \times \frac{(C_0 - C_e)}{M}; \quad \text{Formula 1}$$

In Formula 1, $C_0$ represents the concentration (mg/L) of the precious metal ions in the solution before adsorption;

$C_e$ represents the concentration (mg/L) of the precious metal ions in the solution after adsorption;

$Q_e$ represents the adsorption capacity (mg/g) of the alkynyl-containing porous aromatic framework polymer to the precious metal ions;

V represents the volume (L) of the solution to be treated; and

M represents the mass (g) of the three-dimensional alkynyl-containing porous aromatic framework polymer.

Figure 4:
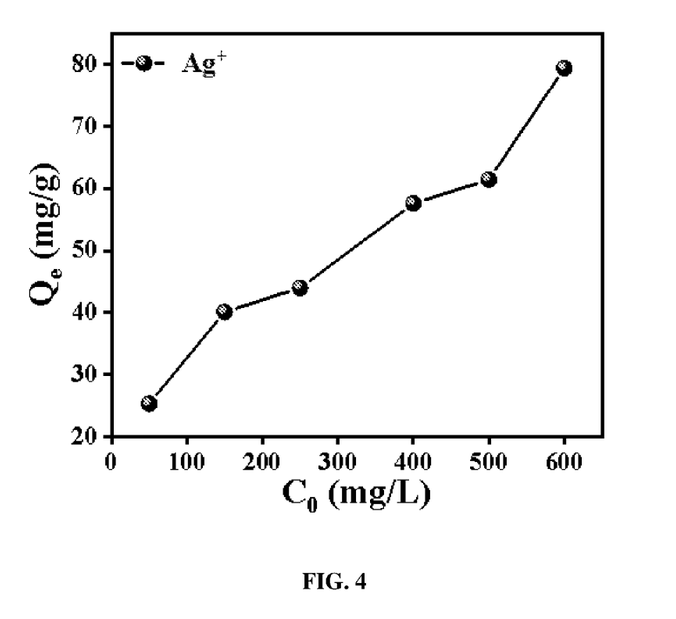
FIG. 4 shows an effect trend of the initial concentrations of silver nitrate aqueous solution on the adsorption capacity of the three-dimensional alkynyl-containing porous aromatic framework polymers in Application Examples.
Figure 5:
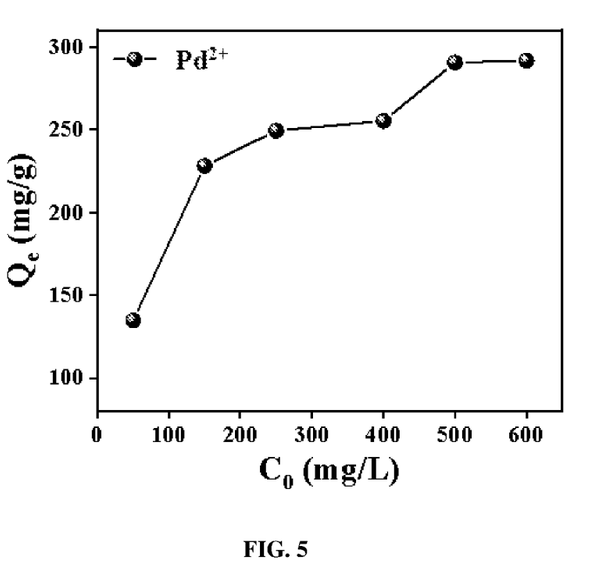
FIG. 5 shows an effect trend of the initial concentrations of sodium tetrachloropalladate aqueous solution on the adsorption capacity of the three-dimensional alkynyl-containing porous framework aromatic polymers in Application Examples.
Figure 6:
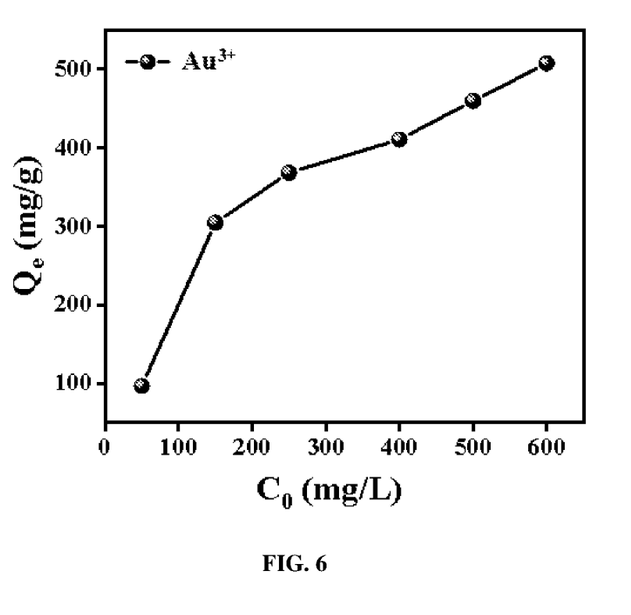
FIG. 6 shows an effect trend of the initial concentrations of chloroauric acid aqueous solution on the adsorption capacity of the three-dimensional alkynyl-containing porous aromatic framework polymers in Application Examples.

The test results of the adsorption performance of PAF-3D are shown in Tables 1 to 3 and FIG. 4 to FIG. 6.

Table 1 Effect of the initial concentration of silver nitrate aqueous solution on adsorption performance of PAF-3D

TABLE 1

| Initial concentration (mg/L) | Adsorption quantity (mg/L) |
|---|---|
| 50 | 25.3 |
| 150 | 40.1 |
| 250 | 44.0 |
| 400 | 57.6 |
| 500 | 61.4 |
| 600 | 79.4 |

FIG. 4 shows an effect trend of the initial concentrations of silver nitrate aqueous solution on the adsorption capacity of PAF-3D. It can be seen from Table 1 and FIG. 4 that with an increase in the initial concentration of silver nitrate aqueous solution, the adsorption capacity of PAF-3D to $Ag^+$ increases, and then gradually tends to be flat, and the maximum adsorption capacity of 79.4 mg/g is reached at 600 mg/L.

Table 2 Effect of the initial concentration of sodium tetrachloropalladate aqueous solution on adsorption performance of PAF-3D

TABLE 2

| Initial concentration (mg/L) | Adsorption quantity (mg/L) |
|---|---|
| 50 | 134.8 |
| 150 | 228.2 |
| 250 | 249.4 |
| 400 | 255.3 |
| 500 | 290.6 |
| 600 | 291.8 |

FIG. 5 shows an effect of the initial concentrations of sodium tetrachloropalladate aqueous solution on the adsorption capacity of PAF-3D. It can be seen from Table 2 and FIG. 5 that with an increase in the initial concentration of sodium tetrachloropalladate aqueous solution, the adsorption capacity of PAF-3D to $PdCl_4^{2-}$ increases, and then gradually tends to be flat, and the maximum adsorption capacity of 291.8 mg/g is reached at 600 mg/L.

Table 3 Effect of the initial concentration of chloroauric acid aqueous solution on adsorption performance of PAF-3D

TABLE 3

| Initial concentration (mg/L) | Adsorption quantity (mg/L) |
|---|---|
| 50 | 97.0 |
| 150 | 304.7 |
| 250 | 368.2 |
| 400 | 410.6 |
| 500 | 459.6 |
| 600 | 507.4 |

FIG. 6 shows an effect trend of the initial concentrations of chloroauric acid aqueous solution on the adsorption capacity of PAF-3D. It can be seen from Table 3 and FIG. 6 that with an increase in the initial concentration of chloroauric acid aqueous solution, the adsorption capacity of PAF-3D to $AuCl_4$ increases, and then gradually tends to be flat, and the maximum adsorption capacity of 507.4 mg/g is reached at 600 mg/L.

Application Example 2

Copper nitrate, cobalt nitrate, zinc nitrate, nickel nitrate, cadmium nitrate, lead nitrate, potassium pyroantimonate, antimony hydroxide, arsenic hydroxide, disodium hydrogen arsenate, and chloroplatinic acid were dissolved in water, obtaining competing ion solutions, Sodium tetrachloropalladate was dissolved in water, obtaining a sodium tetrachloropalladate aqueous solution. An appropriate amount of each competing ion solution was mixed with the sodium tetrachloropalladate aqueous solution, and adjusted the pH value to 2 with hydrochloric acid, obtaining a solution to be treated, In the solution to be treated, each competing ion (calculated as $Cu^{2+}$, $Co^{2+}$, $Zn^{2+}$, $Ni^{2+}$, $Cd^{2+}$, $Pb^{2+}$, $Sb(OH)_3$, $Sb(OH)_3$, $As(OH)_3$, $HAs(OH)_4^{2-}$ and $PtCl_6^{2-}$, respectively) and $PdCl_4^{2-}$ each had a concentration of 100 mg/L.

20 mL of the solution to be treated was added in a conical flask, 10 mg of the PAF-3D prepared in Example 1 was added thereto as an adsorbent. and placed in a constant-temperature shaking box for adsorption for at 25° C. and 180 r/min for 24 h. A small amount of the solutions before and after adsorption were taken out to detect the initial and final concentrations of each competing ion and $PdCl_4^{2-}$ in the solution before and after adsorption by flame atomic absorption spectrometry.

Application Example 3

Potassium nitrate and potassium sulfate were dissolved in water, respectively, obtaining competing ion solutions.

Sodium tetrachloropalladate was dissolved in water, obtaining a sodium tetrachloropalladate aqueous solution. An appropriate amount of each competing ion solution was mixed with the sodium tetrachloropalladate aqueous solution, and adjusted the pH value to 2 with hydrochloric acid, obtaining a solution to be treated, in which each competing ion ($NO_3^-$ and $SO_4^{2-}$) and $PdCl_4^{2-}$ in the solution to be treated had a concentration of 100 mg/L.

20 mL of the solution be treated was added in a conical flask, 10 mg of the PAF-3D prepared in Example 1 was added thereto as an adsorbent, and placed in a constant-temperature shaking box for adsorption at 25° C. and 180 r/min for 24 h, A small amount of the solution before and after adsorption was taken out to detect the initial and final concentrations of $PdCl_4^{2-}$ in the solution before and after adsorption by flame atomic absorption spectrometry. The initial and final concentrations of each competing ion in the solution before and after adsorption were detected by anion chromatography.

According to the test results of Application Examples 2 and 3, the selectivity coefficients of the palladium ion to the different competing ions was calculated. The calculation formula of the selectivity coefficient was represented by Formula 2 and Formula 3:

$$D = \frac{(C_i - C_f) \cdot V}{C_f \cdot M}; \text{ and} \quad \text{Formula 2}$$

$$\beta_{Pd^{2+}/M^{n+/n-}} = \frac{D_{Pd^{2+}}}{D_{M^{n+/n-}}}; \quad \text{Formula 3}$$

in Formula 2, $C_i$ represents the initial concentration (mmol/L) of target ions (including competing ions or $PdCl_4^{2-}$) in the solution before adsorption;
$C_f$ represents the final concentration (mmol/L) of the target ions in the solution after adsorption;
V represents the volume (L) of the solution to be treated;
M represents the mass (g) of the three-dimensional alkynyl-containing porous aromatic framework polymer; and
D represents the distribution ratio (L/g) of the target ions in the solution;
in Formula 3, $\beta_{Pd^{2+}/M^{n+/n-}}$ represents the selectivity coefficient of $Pd^{2+}$ to the competing ions;
$D_{Pd^{2+}}$ represents the distribution ratio (L/g) of $Pd^{2+}$; and $D_M^{n+/n-}$ represents the distribution ratio (L/g) of the competing ions.

The test results of the selective adsorption capacity of PAF-3D to palladium ions (calculated based on $PdCl_4^{2-}$) are shown in Table 4.

Table 4 Selectivity coefficient of palladium ions to the competing ions in solution

TABLE 4

| Ions | Selectivity Coefficient |
| --- | --- |
| $\beta Pd^{2+}/Pb^{2+}$ | 701.9 |
| $\beta Pd^{2+}/Zn^{2+}$ | 275.5 |
| $\beta Pd^{2+}/Cu^{2+}$ | 247.1 |
| $\beta Pd^{2+}/Cd^{2+}$ | 157.9 |
| $\beta Pd^{2+}/Co^{2+}$ | 156.5 |
| $\beta Pd^{2+}/Ni^{2+}$ | 84.8 |
| $\beta Pd^{2+}/As^{5+}$ | 25.6 |
| $\beta Pd^{2+}/As^{3+}$ | 8.6 |
| $\beta Pd^{2+}/Sb^{5+}$ | 13.8 |
| $\beta Pd^{2+}/Sb^{3+}$ | 20.8 |

TABLE 4-continued

| Ions | Selectivity Coefficient |
| --- | --- |
| $\beta Pd^{2+}/Pt^{4+}$ | 5.9 |
| $\beta Pd^{2+}/NO3^-$ | 119.1 |
| $\beta Pd^{2+}/SO4^{2-}$ | 63.2 |

It can be seen from Table 4 that in the solution system in which multiple competing ions coexist in Application Example 2, the selectivity coefficients of palladium ions to competing ions each are greater than 0, and the selectivity coefficient to the palladium ions is as high as 701.9, indicating that the PAF-3D has a satisfactory selective adsorption capacity for precious metal palladium ions. In the solution system in which multiple competing ions coexist in Application Example 3, the selectivity coefficients of palladium ions to acid radical ions $NO_3^-$ and $SO_4^{2-}$ are 119.1 and 63.2, respectively. The higher selectivity coefficient indicates that the acid anions in the solution are difficult to compete with the palladium ion for adsorption, which will not affect the adsorption of the palladium ions by PAF-3D.

The examples as described above are merely preferred embodiments of the present disclosure. It should be understood that for those skilled in the art, several improvements and modifications could be made without departing from the principle of the present disclosure, and those improvements and modifications shall be within the protection scope of the present disclosure.

What is claimed is:

1. A method of using a three-dimensional alkynyl-containing porous aromatic framework polymer, comprising:
   using the three-dimensional alkynyl-containing porous aromatic framework polymer to adsorb precious metal ions in water,
   wherein the three-dimensional alkynyl-containing porous aromatic framework polymer has a structure represented by Formula I:

Formula I and wherein the three-dimensional alkynyl-containing porous aromatic framework polymer has a pore diameter of 0.5 nm to 1.0 nm and a pore volume of 0.3 cm$^3$/g to 0.6 cm$^3$/g, and wherein adsorption is conducted under shaking at a rotation speed of 150 r/min to 200 r/min.

2. The method of claim 1, wherein before the using, the method further comprises preparing the three-dimensional alkynyl-containing porous aromatic framework polymer by a process comprising:

under a protective atmosphere, mixing tetrakis(p-bromophenyl)methane, 1,3,5-triethynyl benzene, a catalyst and an amine solvent, and subjecting a resulting mixture to a Sonogashira-Hagihara coupling reaction to obtain the three-dimensional alkynyl-containing porous aromatic framework polymer having the structure represented by Formula I.

3. The method of claim 2, wherein a molar ratio of 1,3,5-triethynyl benzene to tetrakis(p-bromophenyl)methane is in a range of (1-3): 1.

4. The method of claim 2, wherein the catalyst comprises cuprous iodide and tetrakis(triphenylphosphine)palladium; a molar ratio of cuprous iodide to tetrakis(triphenylphosphine) palladium is in a range of 1:(0.8-1.2); and a molar ratio of tetrakis(p-bromophenyl)methane to tetrakis(triphenylphosphine)palladium is in a range of (9-20):1.

5. The method of claim 2, wherein the amine solvent comprises N,N-dimethylformamide and triethylamine; a volume ratio of N,N-dimethylformamide to triethylamine is in a range of 1:(0.8-1.2); and a dosage ratio of tetrakis(p-bromophenyl)methane to triethylamine is in a range of (0.05-0.3) mmol:1 mL.

6. The method of claim 2, wherein the Sonogashira-Hagihara coupling reaction is conducted at a temperature in a range of 80° C. to 120° C.; and the Sonogashira-Hagihara coupling reaction is conducted for 24 h to 96 h.

7. The method of claim 2, further comprising the following steps after the Sonogashira-Hagihara coupling reaction:

immersing a product system obtained from the Sonogashira-Hagihara coupling reaction in chloroform, then separating solid and liquid to obtain a solid material, and subjecting the solid material to washing, Soxhlet extraction and drying in sequence to obtain the three-dimensional alkynyl-containing porous aromatic framework polymer.

8. The method of claim 7, wherein reagents used in the washing comprise chloroform, acetone, water and methanol in sequence; and a reagent used in the Soxhlet extraction is methanol.

9. The method of claim 1, wherein the precious metal ions comprise at least one selected from the group consisting of silver ions, gold ions and palladium ions.

* * * * *